(12) United States Patent
Calmer (10) Patent No.: US 8,857,139 B1
(45) Date of Patent: Oct. 14, 2014

(54) METHOD AND APPARATUS FOR STALK SHEAR REDUCTION

(76) Inventor: Marion Calmer, Alpha, IL (US)

( * ) Notice: Subject to any disclaimer, the term of this patent is extended or adjusted under 35 U.S.C. 154(b) by 0 days.

(21) Appl. No.: 13/465,857

(22) Filed: May 7, 2012

Related U.S. Application Data (60) Continuation of application No. 12/772,144, filed on Apr. 30, 2010, now abandoned, which is a continuation of application No. 11/729,282, filed on Mar. 28, 2007, now abandoned, which is a division of application No. 10/726,348, filed on Dec. 3, 2003, now abandoned.

(51) Int. Cl.
*A01D 45/02* (2006.01)

(52) U.S. Cl.
USPC .......................................... 56/106; 56/14.3

(58) Field of Classification Search
USPC ............. 56/11.1, 11.6, 12.6, 14.3, 51, 59, 62, 56/53, 94, 104, 106, 119, DIG. 6, DIG. 9
See application file for complete search history.

(56) References Cited

U.S. PATENT DOCUMENTS

| | | | | |
|---|---|---|---|---|
| 2,825,195 A * | 3/1958 | Smith | ............................ | 56/13.5 |
| 3,462,928 A * | 8/1969 | Schreiner et al. | ............... | 56/104 |
| 4,227,366 A * | 10/1980 | Pucher | ............................ | 56/14.2 |
| 7,373,767 B2 * | 5/2008 | Calmer | ............................ | 56/95 |
| 2005/0120695 A1 * | 6/2005 | Calmer | ............................ | 56/51 |
| 2007/0180806 A1 * | 8/2007 | Calmer | ............................ | 56/59 |
| 2010/0218474 A1 * | 9/2010 | Calmer | ............................ | 56/59 |

* cited by examiner

*Primary Examiner* — Alicia Torres
(74) *Attorney, Agent, or Firm* — Hamilton IP Law, PC; Jay R. Hamilton; Charles A. Damschen

(57) ABSTRACT

Four (4) methods to reduce stalk shear in a corn head row unit utilize a non-variable or dependent drive system. The four methods described include altering the gearbox ratio, increasing the lengths of the fluted portion of the stalk roll, increasing stalk roll diameter or reducing the size of the gathering chain drive sprocket. A method for reducing the size of the gathering chain drive sprocket includes the steps of providing a kit with a kit gathering chain drive sprocket of reduced size and replacing the gathering chain drive sprocket with the kit gathering chain drive sprocket.

16 Claims, 9 Drawing Sheets

METHOD AND APPARATUS FOR STALK SHEAR REDUCTION

CROSS REFERENCE TO RELATED APPLICATIONS

This non-provisional patent application claims priority from and is a continuation of U.S. patent application Ser. No. 12/772,144 filed on Apr. 30, 2010 now abandoned, which application was a continuation of and claimed priority from U.S. patent application Ser. No. 11/729,282 filed on Mar. 28, 2007 now abandoned, which application was a divisional of and claimed priority from U.S. patent application Ser. No. 10/726,348 filed on Dec. 3, 2003 now abandoned.

FIELD OF THE INVENTION

The apparatus described herein is generally applicable to the field of agricultural equipment, The embodiments shown and described herein are more particularly for improved harvesting of corn plants.

STATEMENT REGARDING FEDERALLY SPONSORED RESEARCH OR DEVELOPMENT

No federal funds were used to develop or create the disclosed invention.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. §1.171 (d)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

This invention relates to corn harvesting machinery and more particularly the corn row unit of the corn head commonly used with modern self-propelled combines. Corn heads include individual row units normally designed for harvesting a single row of crop material. To accommodate various spacings between rows of crops, these row units are usually adjustably attached to a horizontally disposed frame member. The modern trend in corn headers appears to be one of placing the row units at a low profile to the ground, closer together and providing for increasingly larger throughputs.

Each row unit contains a row crop divider, a row unit hood, gathering/conveying chain(s), two stripper plates, two stalk rolls, a row unit frame, and a gearbox. The gearbox powers the row unit for gathering corn plants then stripping, separating, and conveying ears of corn from the corn plant.

The transversely disposed power input shaft is powered by the combine and delivers rotational power to the individual row units. As can be seen in U.S. Pat. No. 3,589,110, for example, this power input shaft is commonly placed within the gearbox and continues therethrough from one gearbox to the next. To save costs, reduce complexity, and provide constant lubrication the internal gears are contained in a sealed gearbox. The slip clutch for each respective gearbox is seen affixed to a member contained within the gearbox and movable therewith. Typically the operating speed relationship of the stalk rolls and gathering chains is fixed as is the size of the external sprockets and stalk rolls.

Figures 1, 2:
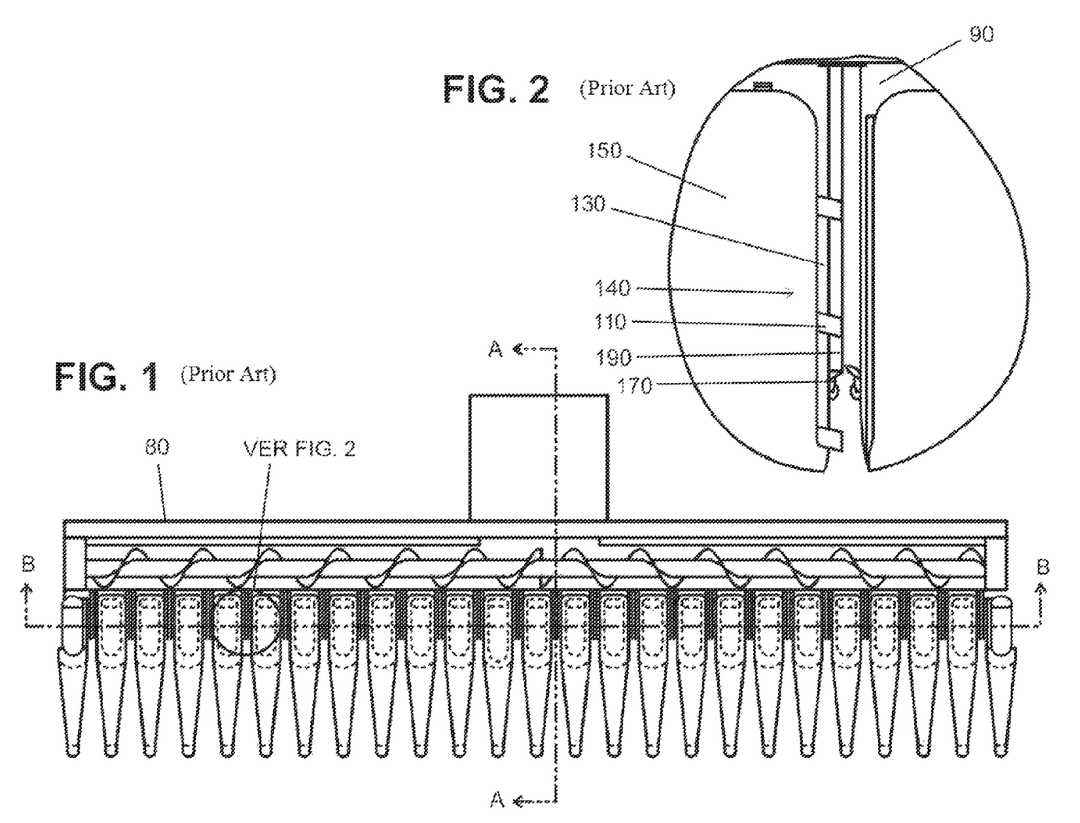

As shown in FIG. 1, corn heads are provided with several row crop dividers for retrieving, lifting, and directing the rows of corn stalks toward their respective ear separation chambers. FIG. 2 shows a top isolated view of the row crop divider and more particularly the gathering chains and stalk rolls of the corn row unit as typically found in the prior art.

Figure 3:
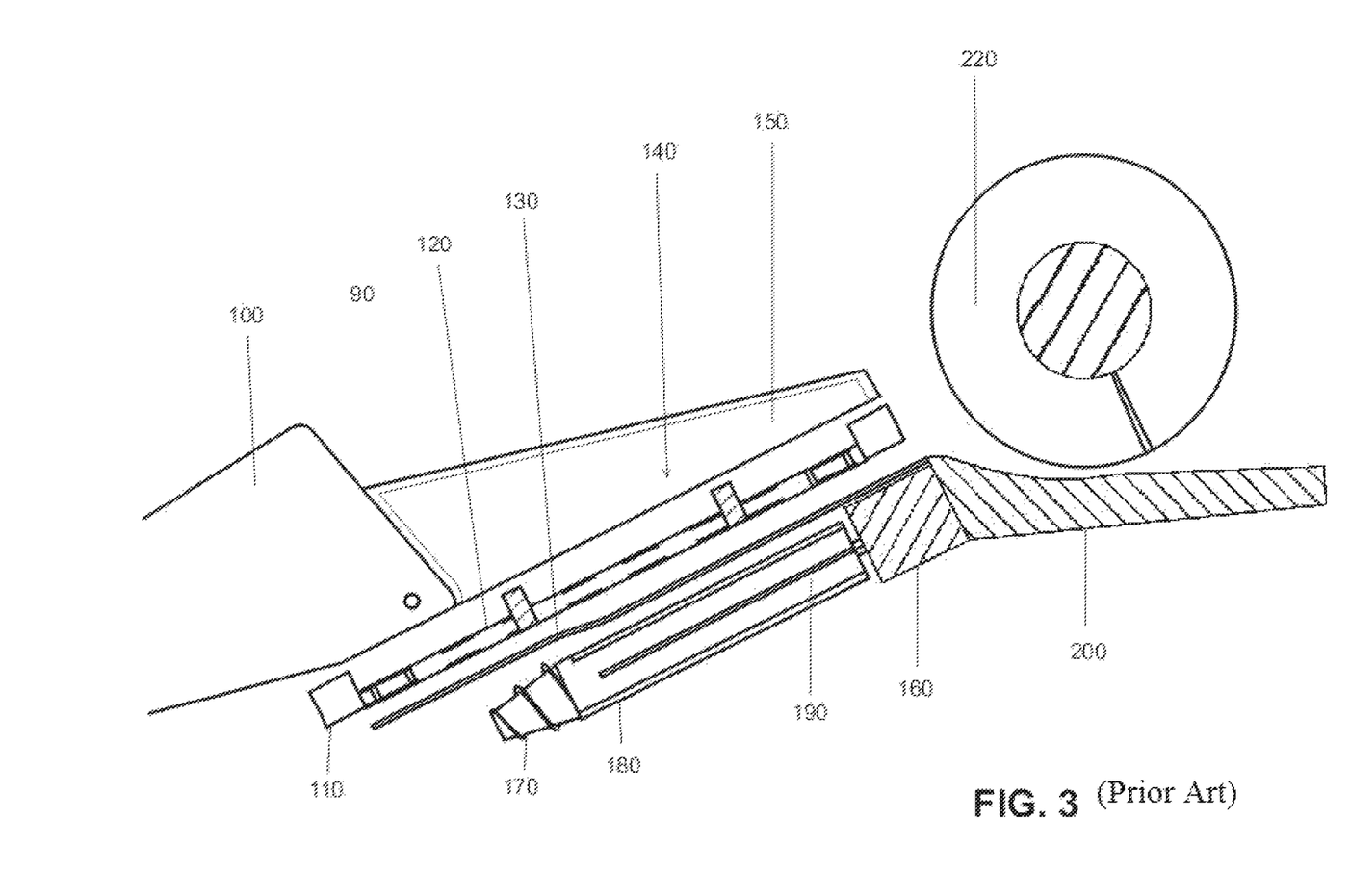

FIG. 3 shows the side view of a row unit found in the prior art. The stalk rolls are powered by a gearbox. As the stalk rolls rotate, the flutes on the stalk rolls pull the corn stalk downward. Two stripper plates located above the stalk rolls and on both sides of the corn row are spaced wide enough to allow to the corn plant to pass between them but narrow enough to retain the ear of corn which contain grain. This causes the ears of corn to be separated from the corn plant as it is pulled downward through the stripping plates. The stalk rolls continue to rotate ejecting the unwanted portions of the corn plant below the corn head thereby returning the unwanted portions to the field. The cooperative interaction of the stalk rolls, the stripping plates and the gathering chains of the row unit are defined as the ear separation chamber.

In the past 30 years four (4) external factors have impacted corn harvesting: (1) Corn stalk harvest heights have continued to increase. (2) Corn yields have doubled through improved genetics, fertilization, populations, and row spacings. (3) Genetics also improved insect resistance, which improved plant health, stalk vigor, and increase height at harvest time. (4) Harvesting machines are larger with increased horsepower, capacity, ground speed and utilize corn heads with more row units. These factors in combination require that during ear separation modern row units must: (1) Increase the rate of ear separation. (2) Ensure that the corn plant is not severed from its roots system. (3) Increase the speed at which corn stalks are ejected from the row unit. (4) Retain minimal amounts of MOTE (material other than ears) in the heterogeneous material being delivered to the combine for threshing.

Through research, operations, and testing, applicant has found that a major evolving problem in harvesting today's corn hybrids is a large build up of plant material (MOTE plus ears) in front of the cross auger during operation of the corn head. Combine operators commonly refer to this mass of material as "trash", "muskrat huts", "hair ball", or simply "a pile of fluff". The accumulation of MOTE reduces the efficiency of the corn head. Many times operators claim this accumulation of trash or fluff will occur during the best operating times of the day. This is especially the case when the corn is extremely dry as may be found on fall afternoons with low humidity. The appearance of this fluff or trash may be severe enough to require harvesting equipment to shut down.

During field testing, several kill stop examinations of this large pile of trash confirmed that it is composed of long pieces or the top portion of the corn plant, which had been sheared off or broken off by the gathering chain paddles. When harvesting down corn it was also noticed that root balls were unnecessarily being pulled out of the ground and dragged into the corn head due to excessive gathering chain speed.

Previous to this invention, the prior art in this field has taught that to increase row unit capacity, travel speeds and reduce trash intake the gathering chain speed should be increased. U.S. Pat. No. 3,462,928 ('928) teaches a dependent drive system employing an eight (8) tooth gathering chain drive sprocket. As taught by '928, the gear means within the gear housing drives not only the stalk rolls but also the endless gathering chains. Based on applicant's experience, this (8) tooth gathering chain sprocket appears to be the predominate size still in use with John Deere dependent drive systems.

U.S. Pat. No. 5,921,070 issued to Chamberlain ("Chamberlain") teaches that the optimum gathering belt speed is approximately equal to the ground speed of the harvester. If the ground speed of the harvester needs to be decreased due to crop or environmental conditions, the gathering belt speed must be decreased. According to Chamberlain to meet this challenge, an independent drive system allowing independent speed control of both the gathering belts and stalk rolls is required.

There are numerous disadvantages and weaknesses in the teachings found in Chamberlain. A corn head with both variable knife and gathering belt speed requires additional elements such as motors, gearboxes and driveshafts. This increase in equipment increases the weight of the corn head and the power required to drive the head, increasing both the cost of manufacture and operation. Additionally, Chamberlain does not teach a method to convert an existing corn head having a dependent drive system. Furthermore, Chamberlain teaches that for high ground speed operations, the gathering belt speed must be higher to match the ground speed.

Field testing and experimentation by the applicant have shown that in fact reduction of gathering chain speed reduces stalk shear allowing increased ground speed operations through improved ear separation and threshing efficiencies. It has been found that when the gathering chain paddle and the corn plant enter the row unit at the same time, the stalk roll flutes are going to start pulling the corn plant downward. At the same time the gathering chain paddle is pushing the stalk up the ear separation chamber. At this point the corn stalk is simultaneously moving both laterally and vertically. If the corn stalk reaches the end of the ear separation chamber before the stalk roll consumes the majority of the corn stalk, lateral movement stops because the corn plant stalk has reached the end of the stalk rolls and is lodged against the gearbox. The gathering chain paddle then shears the upper portion of the corn stalk off with the corn plant ear attached and pushes both into the cross auger.

The problem at its most basic is that the stalk roll flutes and the gathering chain paddles are applying energy to the stalk in different directions producing a shearing effect. When the corn stalk reaches the end of the stalk rolls and stops moving horizontally, the movement of the corn stalk becomes restricted. This then allows the stalk to be sheared by the gathering chain paddle resulting in the separation of the stalk from itself. Analysis of stripper plates indicates pronounced wear at the row unit separation point. This would indicate there is significant pressure and wear at this point due to stalks separating against the stripper plate.

Additionally, field testing indicates the node below the ear may be weaker than other nodes in the stalk. The weakness in this node accentuates the tendency of the prior art to separate the stalk from itself when the stalk is subjected to shear. Recently improved agronomic technology and corn genetics have produced taller corn stalks at harvest time further highlighting this problem.

BRIEF SUMMARY OF THE INVENTION

I, Marion Calmer, residing in Alpha, Ill. and being a United States citizen, do herein in this patent application disclose and claim the method of using my invention "Method to Reduce Stalk Shear."

It is an objective to teach a method and apparatus that may allow existing corn head row units with dependent drive systems to reduce the intake of trash or material other than ears (MOTE) and increase harvester ground speed.

It is another objective to teach a method and apparatus that minimizes the corn plant stalks reaching the end of the ear separation chamber with an ear thereby allowing the gathering chain paddles to shear both the upper portion of the stalk and the corn plant ear. Shearing the upper portion of the corn plant stalk with the ear increases the amount of material other than ears (MOTE) reaching the threshing unit of the combine.

It is another objective of this invention to teach a method and apparatus to improve harvesting speeds and increase the bushels and acres a farmer may harvest per day.

It is another objective of this invention to teach a method and apparatus to reduce the intake of trash (or MOTE) in standing corn while also improving the harvesting of down or lodged corn.

It is another objective of this invention to teach a method and apparatus that reduces the loss of grain in the separation and threshing areas of a combine.

It is another objective of this invention to teach a method and apparatus that lowers horsepower requirements and reduces fuel consumption.

Through field testing it has been the found that the larger the number of inches of corn stalk consumed by the stalk rolls and ejected on the ground prior to the gathering chain paddle contacting the stalk, the less trash or MOTE being processed by the combine threshing system. Through testing and calculation, the inventor was able to establish the following formula to calculate the vertical and horizontal pull upon the corn stalk.

The formula states that the number of revolutions of a stalk roll during gathering chain paddle travel across the exposed fluted area of stalk roll multiplied by the outside circumference of the stalk roll approximates the inches of corn stalk consumed by the stalk roll while a gathering chain paddle moves from the start of the stalk roll flute to the end of the stalk roll flute.

R=number of revolutions of stalk roll during chain lug travel of the exposed fluted area of stalk roll
D=diameter of stalk roll (inches)
C=circumference of stalk=D*Pi (inches)
R×C=Inches of Corn Stalk Consumed Applicant has found that one of the best ways to avoid corn stalk shear while the ear is attached to the stalk is to install a smaller gathering chain drive sprocket in a row unit using a dependent drive system. This slows down just the gathering chain or chains while allowing the rest of the corn head to operate at its normal operating speed.

During field tests it was found that when gathering chain paddle speed was reduced by twenty percent (20%) in the Case/IH 800 and 1000 series corn heads, the amount of measured MOTE (by weight) was reduced by as much fifty percent (50%). In field tests on John Deere 40 and 90 series corn heads, MOTE was decreased by almost seventy-five percent (75%) when the gathering chain speed was reduced by thirty-seven point five percent (37.5%). On average, field tests in which a direct comparison was made between the eight (8) tooth gathering chain drive sprocket and a five (5) tooth sprocket, a sixty (60%) reduction in MOTE was produced.

The formula above also allows the calculation of an ear separation speed. This speed represents how fast the ear and the corn stalk move down towards the stalk rolls and stripper plates. Ear separation speed is important because it provides an upper limit to how large the actual stalk roll velocity can be. Increasing ear separation speed reflects the increased ability of the stalk rolls to consume the necessary feet of corn stalk corresponding to both the height of the stalks and the ground speed of the combine. The upper limit for ear separation speed is reached when the ear of corn has enough kinetic energy to actually damage the ear or start the kernel shelling process upon impact with the stripper plates (e.g. butt-shelling). The upper limit of ear separation speed is dependent upon hybrid characteristics and crop conditions. Applicant has operated at ear separation velocities in the range of six to thirteen (6.0-13.0) miles per hour with good results. Equivalent ear separation velocities over thirteen (13) miles per hour have produced damage and premature shelling.

A second way to avoid corn stalk shear while the ear is attached is to change the actual number of teeth used on the internal gears of the gear box that drive the stalk engaging components. A third way to allow unrestricted simultaneous vertical and horizontal pull and reduce corn stalk shear would be to lengthen the exposed fluted area (i.e. area of engagement) of the stalk roll. A fourth way to allow unrestricted simultaneous vertical and horizontal pull and reduce corn stalk shear would be to increase the diameter of the stalk roll used to engage the stalk of the plant.

BRIEF DESCRIPTION OF THE DRAWINGS

FIG. 1 Top View of Corn Head (Prior Art)
FIG. 2 Exploded Top View of Row Unit and Ear Separation Chamber (Prior Art)
FIG. 3 Side view of Row Unit (Prior Art)
FIG. 4 Row Unit Engaged with Corn Stalk—Prior to Ear Separation (Prior Art)
FIG. 5 Row Unit Engaged with Corn Stalk—Ear Separation Point (Prior Art)
FIG. 6 Row Unit Engaged with Corn Stalk—Post Ear-Separation (Prior Art)
FIG. 7 Row Unit Engaged with Corn Stalk—Prior to Ear Separation
FIG. 8 Row Unit Engaged with Corn Stalk—Ear Separation Point
FIG. 9 Row Unit Engaged with Corn Stalk—Post Ear-Separation
FIG. 10 provides a perspective view of a row unit simultaneously engaged with multiple corn plant stalks.

DETAILED DESCRIPTION

| Listing of the Elements | |
| --- | --- |
| Description | Number |
| Corn head | 80 |
| Row unit | 90 |
| Row unit dividers | 100 |
| Gathering chain paddles | 110 |
| 8 tooth gathering chain drive sprocket (Prior Art) | 112 |
| 5 tooth (kit) gathering chain drive sprocket | 115 |
| Gathering chain | 120 |
| Stripper plates | 130 |
| Row unit shear point | 135 |
| Ear Separation Chamber | 140 |
| Row unit covers | 150 |
| Gearbox | 160 |
| Transport vanes | 170 |
| Stalk Roll flutes | 180 |
| Stalk rolls | 190 |
| Cross Auger Trough | 200 |
| Cross Auger | 220 |
| Corn plant ear | 300 |

| Listing of the Elements -continued | |
| --- | --- |
| Description | Number |
| Upper Portion of Corn Plant Stalk | 325 |
| Lower Portion of Corn Plant Stalk | 330 |

The general operation of corn heads incorporating this invention in FIGS. 1 through 9 are similar to that of the operation of corn heads of the prior art as illustrated in FIGS. 1, 2 and 3. As shown in FIG. 1, corn heads are provided with several row crop dividers 100 for retrieving, lifting, and directing the rows of corn stalks toward their respective ear separation chambers 140. In FIGS. 1 and 3 the corn stalks are lifted and guided toward the row unit 90 by row unit dividers 100. Row unit cover 150 lifts and separates the corn plants. FIG. 2 shows a top isolated view of the ear separation chamber 140 with row crop divider 100 and more particularly the gathering chains 120 and stalk rolls 190 of the corn row unit as typically found in the prior art. The power to drive this corn head row unit arrangement is provided from a main drive shaft through a gearbox 160 as described in the prior art. See U.S. Pat. No. 3,462,928.

Figure 4:
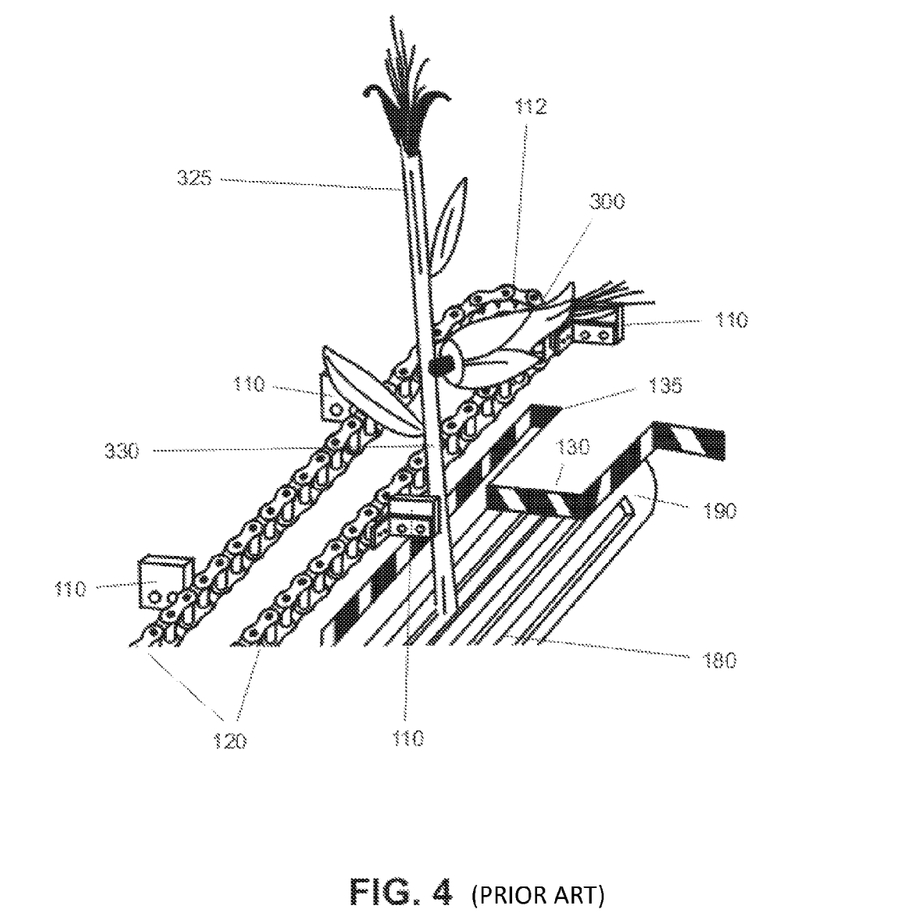
Figure 5:
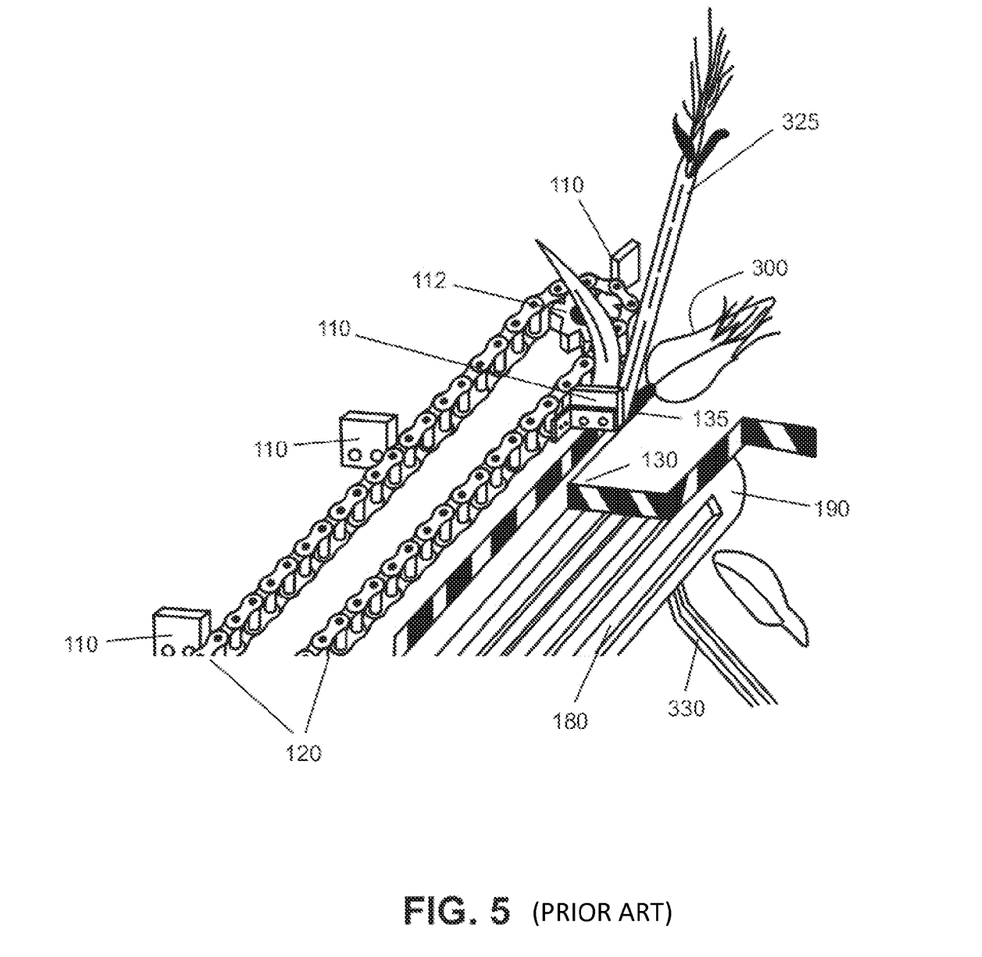
Figure 6:
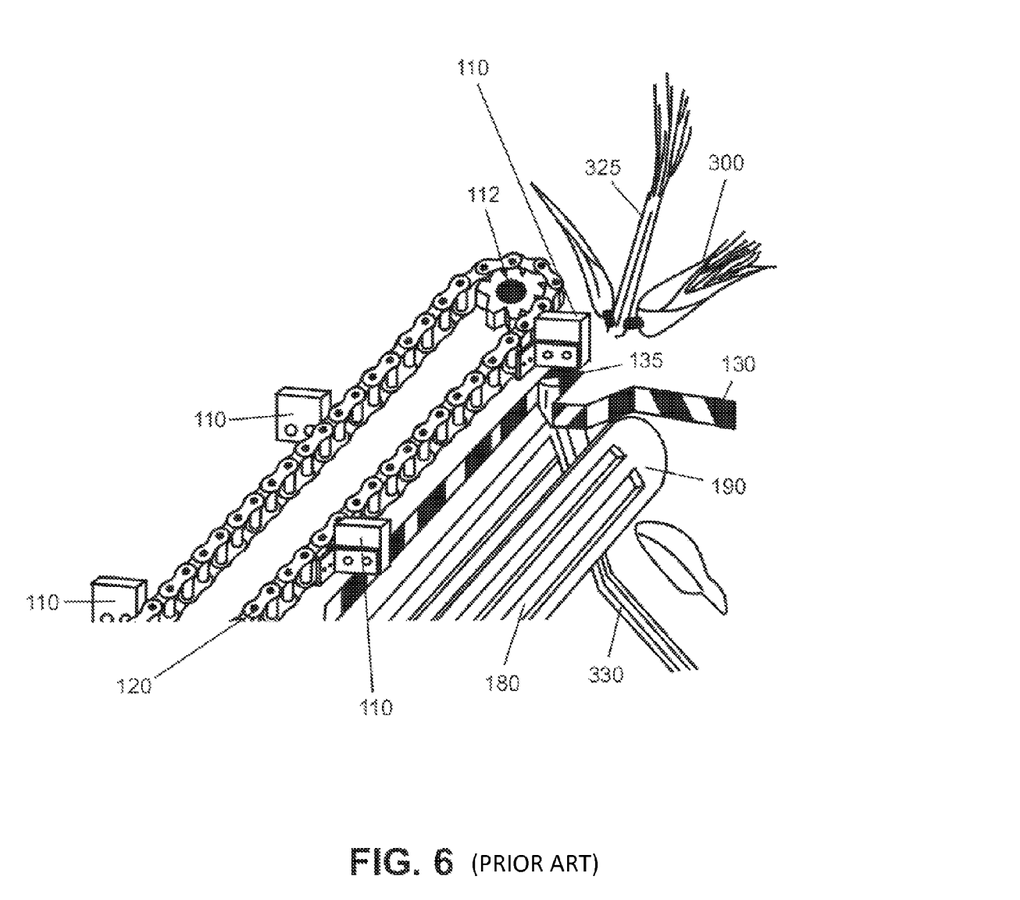

FIG. 3 shows the side view of a row unit 90 found in the prior art from view AA found in FIG. 1. The stalk rolls 190 are typically powered by a gearbox 160. In FIG. 4 as the stalk rolls 190 rotate, the flutes on the stalk rolls 180 contact the sidewalls of the lower portion of the corn stalk 330 and pull the corn stalk downward. Two stripper plates 130 located above the stalk rolls 190 and on both sides of the row of corn are spaced wide enough to allow the corn plant to pass between them but narrow enough to retain the ear of corn 300 containing the kernels of corn or grain. This causes the ears of corn 300 to be separated from the corn plant as it is pulled downward through the stripping plates 130. The stalk rolls 190 continue to rotate ejecting the unwanted portions of the corn plant below the corn head 80 thereby returning the unwanted corn stalk portions to the field. The gathering chain paddles 110 contact the ears of corn 300 and convey them to the cross auger trough 200. Where cross auger 220 conveys the ears of corn 300 towards the center of the corn head 80 for further conveyance through the combine feeder house and into the threshing area of the combine. FIGS. 4-6 show an exploded cut-away view of the ear separation process as taught by the prior art from view B-B found in FIG. 1. In these drawings, the row unit cover 150 and a portion of the stripper plate 130 have been removed to allow a better representation of the process. FIG. 4 shows the corn row unit 80 of the prior art engaged with a corn plant. As shown by FIGS. 3 and 4 of the prior art, the corn plant first enters the stalk rolls 190 through the transport vanes 170 at the ends of the stalk rolls 190. The stalk roll flutes 180 contact the lower portion of the corn plant stalk 330 and begin to pull the corn plant stalk down towards the stripper plates 130. At the same time the gathering chain paddles 110 also enter the row unit 90.

In FIG. 5 the corn plant stalk is simultaneously moving both laterally and vertically. As taught by the prior art, a substantial number of corn plant stalks typically reach the end of the stalk rolls 190 before the stalk roll 190 has consumed the upper portion of the corn plant stalk 325 above the ear 300. The corn plant stalk hits row unit shear point 135 effectively stopping or restricting the lateral movement of the corn plant stalk and positions the upper portion of the corn plant stalk 325 to be sheared along with the corn plant ear 300 by the gathering chain paddles 110.

As shown in FIG. 6, when the lateral movement of the corn plant stalk has stopped at the end of the ear separation chamber 140, the gathering chain paddle 110 moves into contact with and shears off the upper portion of the corn plant stalk 325 while the corn plant ear 300 is still attached to the corn plant stalk 325. Both the upper portion of the corn plant stalk 325 and the corn plant ear 300 are then conveyed into the cross auger trough 200. As shown in drawings 4-6, the corn stalk point of restricted movement in the ear separation chamber 140 is defined as row unit shear point 135. Contact between the upper portion of corn stalks 325 and the row unit shear point 135 increases the amount of material other than ears (MOTE) that must be processed by the combine, reducing separation efficiencies and increasing horsepower requirements.

Figure 7:
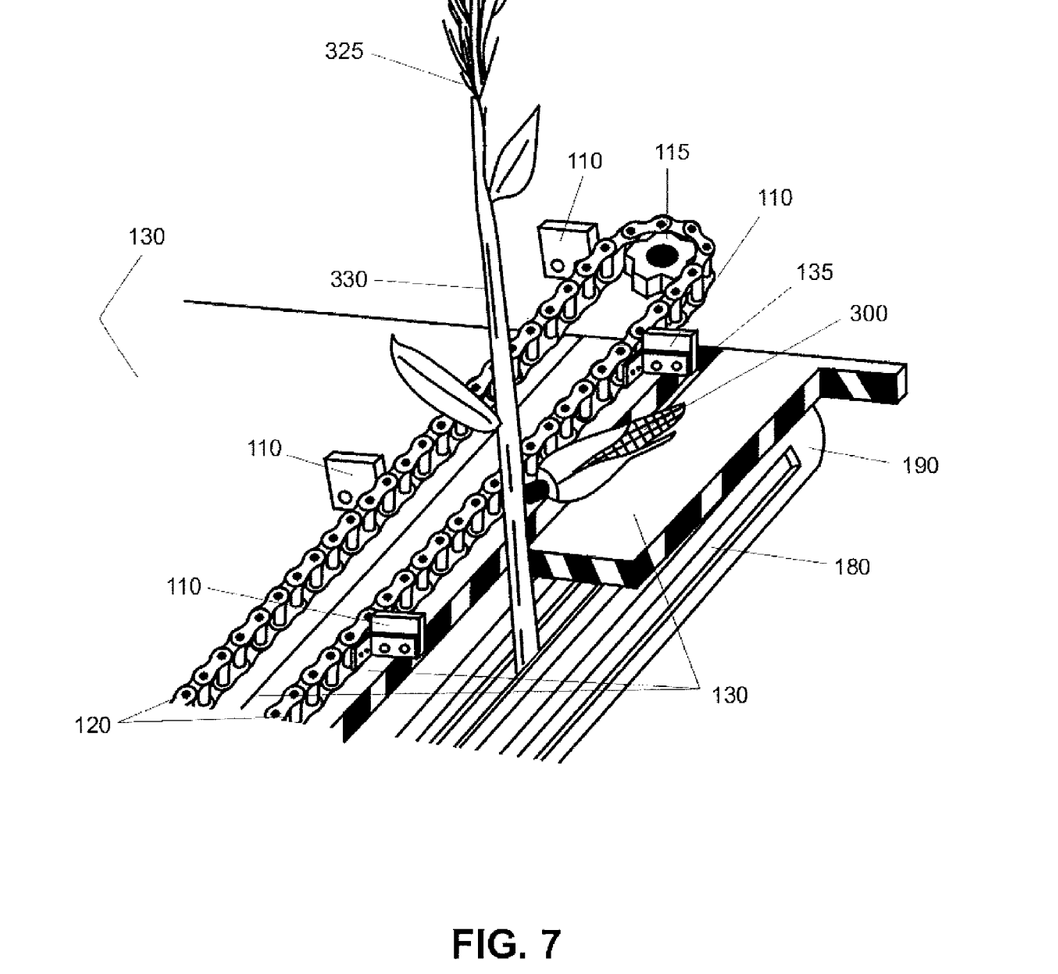
Figure 8:
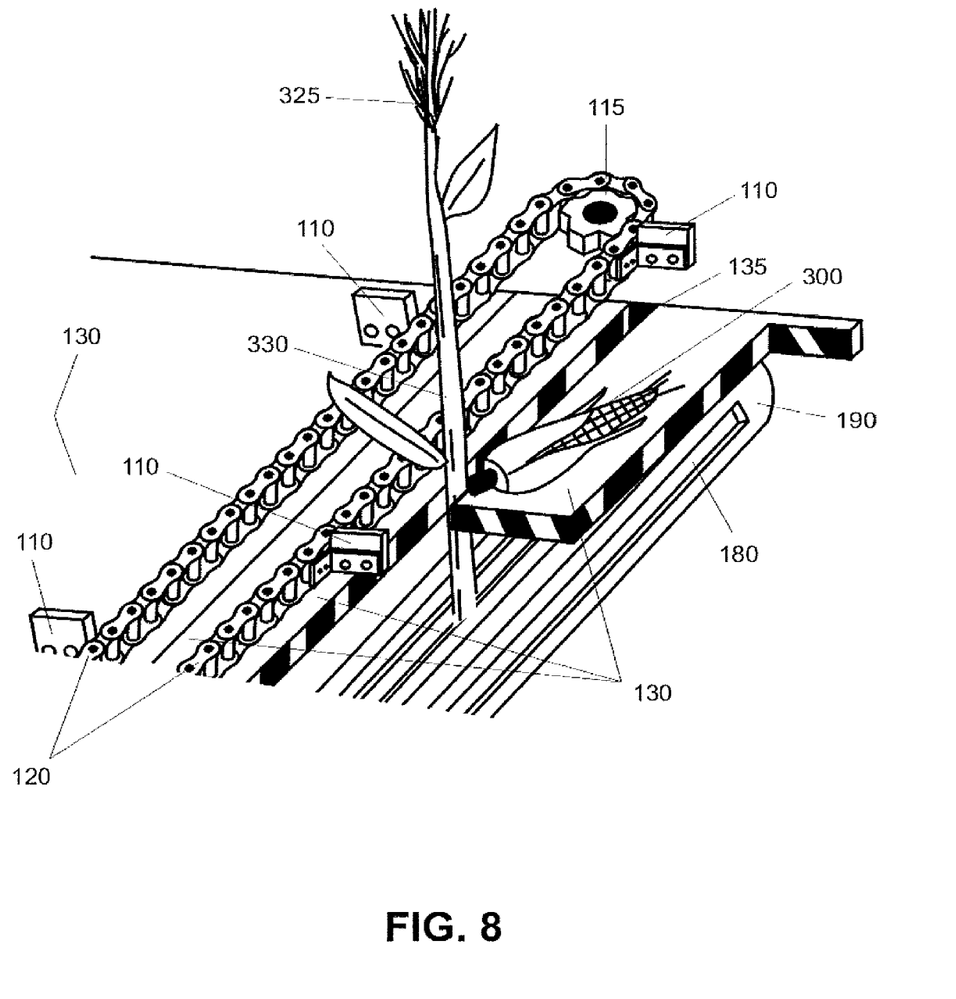
Figure 9:
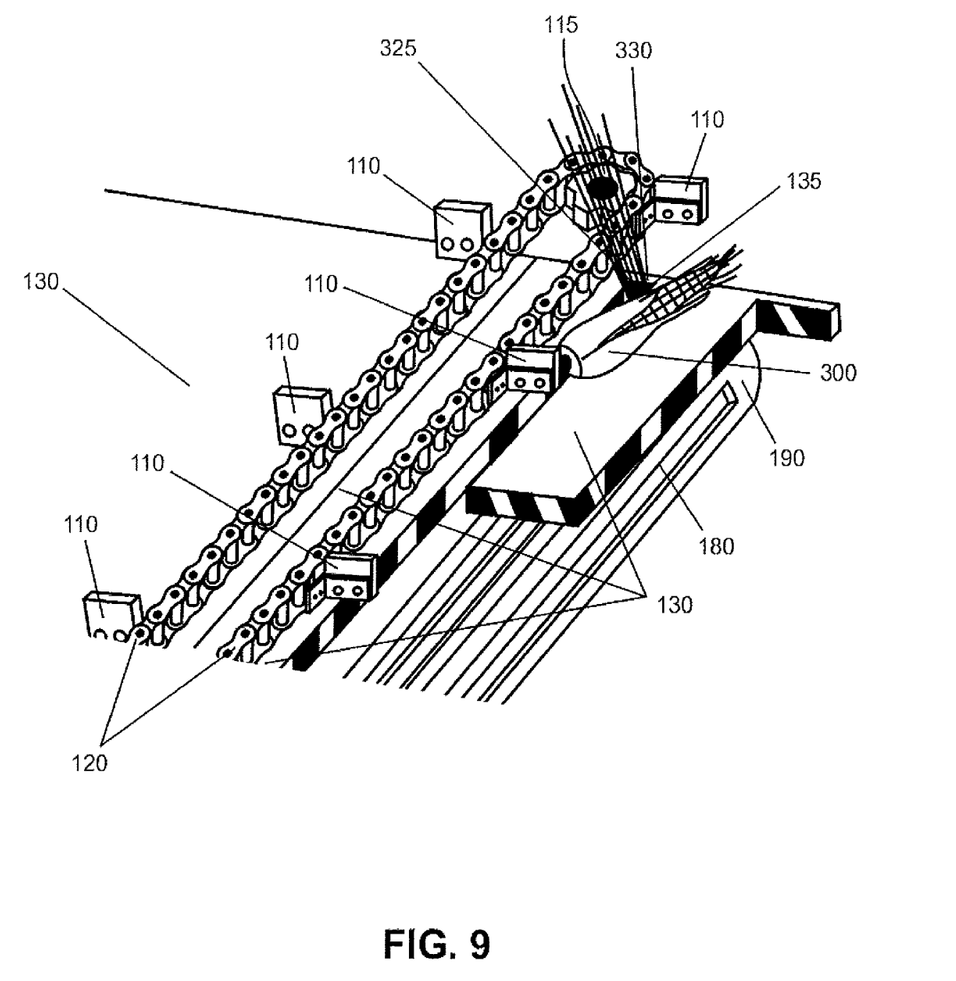

FIGS. 7-9 shows a similar sequence of events for the present invention with an improved result. FIG. 7 shows the side view of the improved row unit 90 powered by a gearbox 160. As the stalk rolls 190 rotate, the flutes on the stalk rolls 180 contact the sidewalls of the lower portion of the corn plant stalk 330 and upper portion of the corn plant stalk 325 downward. The gathering chain paddles 110 enter the ear separation chamber 140 at a lower velocity than in the prior art. As shown in FIG. 8, the rotation of the stalk rolls 190 pulls the corn plant stalk down towards the stripper plates 130 with less interference from the slower speed gathering chain paddles 110 allowing the ear of corn 300 to separate from the corn plant. After ear separation the integrity of the corn plant stalk is substantially maintained so that both the upper portion 325 and lower portion of the corn plant stalk 330 are processed through the stalk rolls 190. As shown in FIGS. 8 and 9, the gathering chain paddles 110 are substantially for engagement and conveyance of the corn plant ear 300 through the ear separation chamber 140 and to auger trough 200. In operation, substantially fewer corn stalks contact the row unit shear point 135 and the gearbox 160 at the end of the ear separation chamber 140 thereby reducing the incidence of the corn stalk shear which reduces MOTE and increases separation efficiencies.

Figure 10:
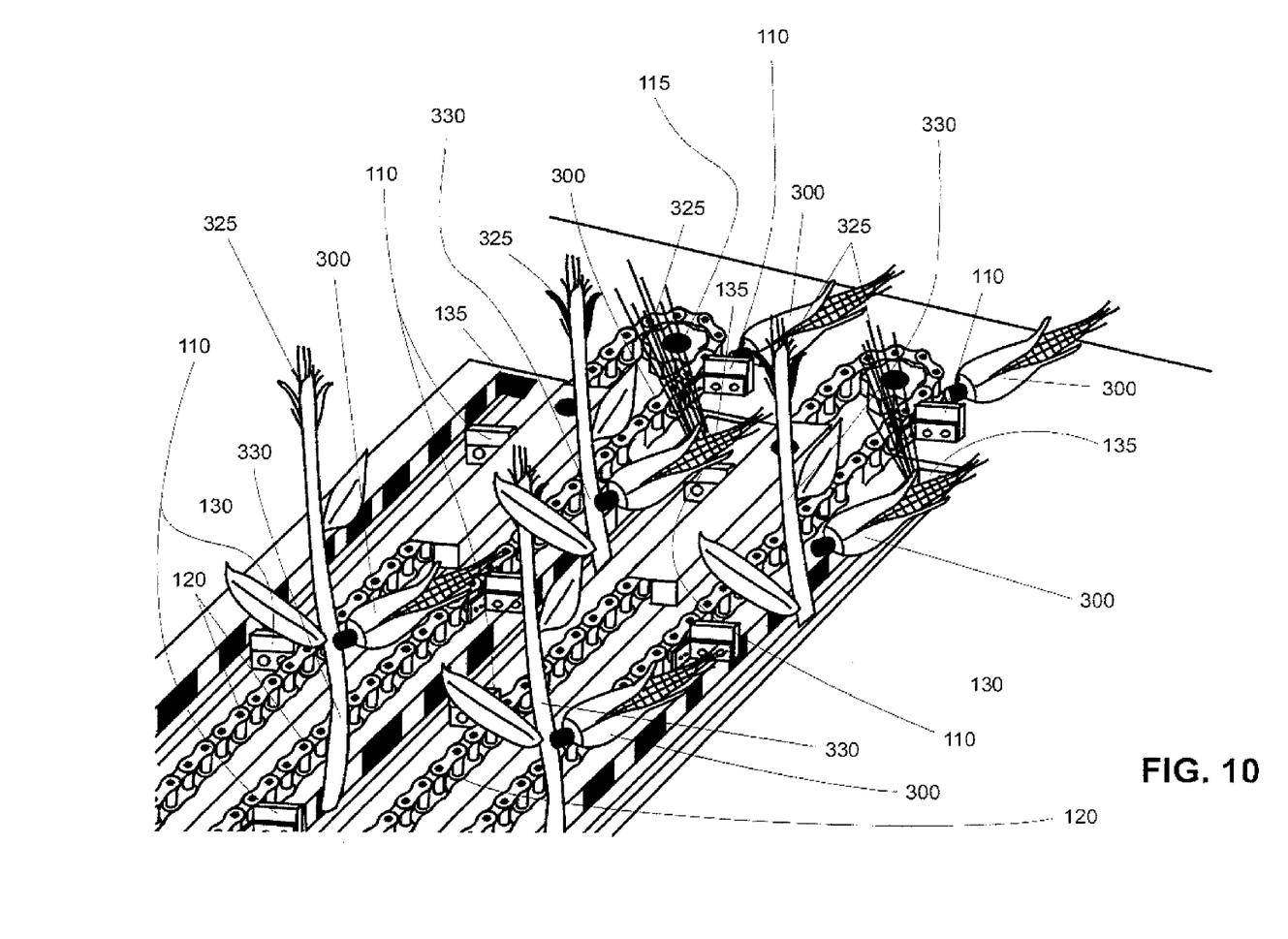

FIG. 10 provides a final view of the present invention and presents all three steps of the ear separation process as described in FIGS. 7-9 in one view. As in FIGS. 7-9 the row unit covers 150 and row unit dividers 100 have been removed from the drawings to allow a better view of the process and do not represent a change to the equipment or process. In this particular figure, the invention is applied to a dual gathering chain 120 system. The figure shows the corn plants entering the stalk rolls 190 from the left side of the figure and reflect the pre-ear separation step. The next corn plants to the right in the figure represent corn plants in the ear separation process. The post-ear separation process is represented both by the upper portion of the stalk 325 barely visible above the stripper plate 130 and row unit shear point 135. Throughout the process of the invention, contact between the corn plant stalk and gathering chain paddles 110 is minimized. The slower speed gathering chain paddles 110 primarily contact ears 300 separated from the corn plant stalks for conveyance to the cross auger 220 and combine harvester reducing the possibility that a gathering chain paddle 110 will push into the upper portion of the corn plant stalk 325 and produce a shearing of the stalk against either the gearbox 160 or row unit shear point 135. Having described the preferred embodiment, other features of the present invention will undoubtedly occur to those versed in the art, as will numerous modifications and alterations in the embodiments of the invention illustrated, all of which may be achieved without departing from the spirit and scope of the invention.

The invention claimed is:

1. A method for reducing stalk shear in a corn head row unit, said method comprising the steps:
    a. removing a gathering chain drive sprocket, wherein said gathering chain drive sprocket is the original equipment on said corn head row unit, and wherein said gathering chain drive sprocket is cooperatively engaged with a first source of rotational power originating from a gearbox mounted to said corn head row unit;
    b. installing a kit gathering chain drive sprocket in place of said gathering chain drive sprocket such that said kit gathering chain drive sprocket is cooperatively engaged with said first source of rotational power, wherein said kit gathering chain drive sprocket is at least twenty percent (20%) smaller than said gathering chain drive sprocket;
    c. causing a reduction of the linear speed of a gathering chain engaged with said kit gathering chain drive sprocket by at least twenty percent (20%) via said installing step;
    d. engaging a first stalk roll with a second source of rotational power originating from said gearbox;
    e. engaging a second stalk roll with said second source of rotational power originating from said gearbox;
    f. positioning a corn plant stalk between said first and second stalk rolls;
    g. providing rotational power to said gearbox;
    h. allowing said first and second stalk rolls to apply energy to said corn plant stalk in a substantially vertical direction; and
    i. simultaneously allowing said gathering chain to apply energy to said corn plant stalk in a substantially horizontal direction, wherein the rate at which said gathering chain applies energy to said corn plant stalk is reduced compared to the rate applied when using said gathering chain drive sprocket as opposed to said kit gathering chain drive sprocket.

2. The method according to claim 1 wherein said gathering chain drive sprocket is further defined as having eight (8) teeth.

3. The method according to claim 2 wherein said kit gathering chain drive sprocket is further defined as having five (5) teeth.

4. The method according to claim 2 wherein said kit gathering chain drive sprocket is further defined as having six (6) teeth.

5. The method according to claim 1 further comprising the steps:
    a. removing a gathering chain, wherein said gathering chain is the original equipment on said corn head row unit; and
    b. installing a kit gathering chain in place of said gathering chain, wherein said kit gathering chain is at least five percent (5%) shorter than said gathering chain.

6. The method according to claim 1 further comprising the steps:
    a. removing a gathering chain coast sprocket, wherein said gathering chain coast sprocket is the original equipment on said corn head row unit; and
    b. installing a kit gathering chain coast sprocket in place of said gathering chain coast sprocket, wherein said kit gathering chain coast sprocket is at least ten percent (10%) larger than said gathering chain coast sprocket.

7. The method according to claim 6 wherein said gathering chain coast sprocket is further defined as having eight (8) teeth.

8. The method according to claim 6 wherein said kit gathering chain coast sprocket is further defined as having nine (9) teeth.

9. A method comprising:
  a. removing a gathering chain drive sprocket from a corn head row unit, wherein said corn head row unit further comprises:
    i. a first stalk roll for engagement with a corn plant stalk, wherein said first stalk roll has at least one flute attached thereto;
    ii. a second stalk roll for engagement with a corn plant stalk, wherein said second stalk roll has at least one flute attached thereto;
    iii. a gearbox in communication with said a rotational power source from a harvesting machine, wherein a first and second source of rotational power originates from said gearbox, wherein said first and second stalk rolls are cooperatively engaged with said second source of rotational power, and wherein said gathering chain drive sprocket is cooperatively engaged with said first source of rotational power to fix the respective rotational speed of said gathering chain drive sprocket and said stalk roll during operation;
    iv. at least one stripper plate, wherein said at least one stripper plate is positioned above said first and second stalk rolls;
    v. a gathering chain coast sprocket;
    vi. a gathering chain having a plurality of paddles affixed thereto, wherein said gathering chain is cooperatively engaged with said gathering chain drive sprocket and said gathering chain coast sprocket, and wherein said plurality of paddles move in a substantially horizontal direction during operation;
  b. installing a kit gathering chain drive sprocket in place of said gathering chain drive sprocket, wherein said kit gathering chain drive sprocket is at least twenty five percent (25%) smaller than said gathering chain drive sprocket;
  c. wherein installing said kit gathering chain drive sprocket causes a reduction of the linear speed of said gathering chain by at least twenty five percent (25%), and wherein the rotational speed of said first and second sources of power for rotation, said gearbox, and said first and second stalk rolls remain unchanged;
  d. wherein said reduction of the linear speed of said gathering chain causes a corn plant stalk positioned between said first and second stalk rolls to travel in a substantially horizontal direction at a rate that is at least twenty five percent (25%) less than the corresponding rate when said gathering chain drive sprocket is engaged with said gathering chain; and
  e. wherein the rate at which said first and second stalk rolls cause said corn plant stalk to travel in a substantially vertical direction remains unchanged when said gathering chain drive sprocket is replaced with said kit gathering chain drive sprocket, such that the probability of said corn plant stalk shearing prior to removal of all corn ears from said corn plant stalk is reduced, and such that said harvesting machine is capable of harvesting at a faster rate than the rate at which said harvesting machine is capable of harvesting when said gathering chain drive sprocket is engaged with said corn head row unit.

10. The method according to claim 9 wherein said gathering chain drive sprocket is further defined as having eight (8) teeth.

11. The method according to claim 10 wherein said kit gathering chain drive sprocket is further defined as having five (5) teeth.

12. The method according to claim 10 wherein said kit gathering chain drive sprocket is further defined as having six (6) teeth.

13. The method according to claim 9 further comprising the steps:
  a. removing said gathering chain, wherein said gathering chain is the original equipment on said corn head row unit; and
  b. installing a kit gathering chain in place of said gathering chain, wherein said kit gathering chain is at least five percent (5%) shorter than said gathering chain.

14. The method according to claim 9 further comprising the steps:
  a. removing said gathering chain coast sprocket, wherein said gathering chain coast sprocket is the original equipment on said corn head row unit; and
  b. installing a kit gathering chain coast sprocket in place of said gathering chain coast sprocket, wherein said kit gathering chain coast sprocket is at least ten percent (10%) larger than said gathering chain coast sprocket.

15. The method according to claim 14 wherein said gathering chain coast sprocket is further defined as having eight (8) teeth.

16. The method according to claim 15 wherein said kit gathering chain coast sprocket is further defined as having nine (9) teeth.

* * * * *